United States Patent [19]

Tavares

[11] Patent Number: 4,557,490

[45] Date of Patent: Dec. 10, 1985

[54] MAGNETIC SEAL SYSTEM FOR BELT CONVEYOR ROLLERS

[76] Inventor: Luiz M. C. Tavares, Av. Paulista 1106 - 2nd Floor, 01310- Sao Paulo, Brazil

[21] Appl. No.: 614,161

[22] PCT Filed: Sep. 8, 1983

[86] PCT No.: PCT/BR83/00008
§ 371 Date: May 8, 1984
§ 102(e) Date: May 8, 1984

[30] Foreign Application Priority Data

Sep. 8, 1982 [BR] Brazil .................................. 8205247

[51] Int. Cl.⁴ .......................... F16J 15/16; F16J 15/44
[52] U.S. Cl. ......................................... 277/80; 277/55; 277/DIG. 4; 384/480
[58] Field of Search .............. 277/53, 55, 56, 80, 277/DIG. 4; 308/187.1, 187.2; 384/130, 144

[56] References Cited

U.S. PATENT DOCUMENTS

| | | | |
|---|---|---|---|
| 2,863,538 | 12/1958 | Jaeschke | 277/80 X |
| 2,945,730 | 7/1960 | Murray et al. | 277/56 X |
| 2,974,981 | 3/1961 | Vernest et al. | 277/80 |
| 2,996,162 | 8/1961 | Lehde | 277/80 X |
| 3,659,306 | 5/1972 | Stoltze et al. | 277/80 X |
| 4,101,180 | 7/1978 | Anderson et al. | 277/53 X |

FOREIGN PATENT DOCUMENTS

| | | | |
|---|---|---|---|
| 1078830 | 3/1960 | Fed. Rep. of Germany | 308/187.2 |
| 569065 | 1/1924 | France | 277/53 |
| 273178 | 4/1951 | Switzerland | 308/187.2 |
| 761224 | 11/1956 | United Kingdom | 308/187.2 |
| 866987 | 5/1961 | United Kingdom | 308/187.1 |

Primary Examiner—Robert S. Ward
Attorney, Agent, or Firm—Fred A. Winans

[57] ABSTRACT

A magnetic seal system for belt conveyor rollers formed by axially disposed magnetic radial rings forming a labyrinth seal arranged before the ball bearings of the belt conveyor roller.

1 Claim, 1 Drawing Figure

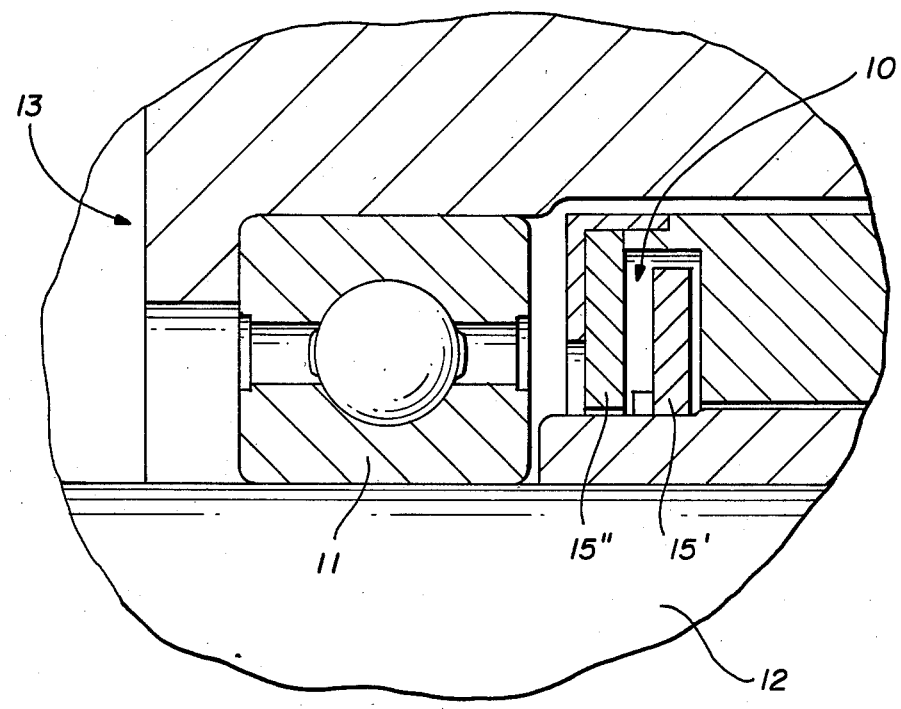

MAGNETIC SEAL SYSTEM FOR BELT CONVEYOR ROLLERS

TECHNICAL FIELD

The present invention relates to a magnetic seal system for belt conveyor rollers and, more particularly, relates to a seal system formed by axially disposed magnetic radial rings forming a labyrinth seal arranged before the ball bearings of belt conveyor rollers for retaining particles of naturally magnetic pollutant dust, thereby avoiding its propagation into the ball bearings.

BACKGROUND ART

For many years an effective form of preventing the entry of naturally magnetic material dust (i.e. dust from iron ore) into the ball bearings of belt conveyor rollers has been sought. Such contaminating material, entering the bearing and polluting them, consequently significantly reduces their useful life by wearing or locking. However, because of the great number of rollers in a conveyor system, the seals could not increase friction without significant inpact on the power required to drive the conveyor. Therefore, rubbing seals were inappropriate, and labyrinth seals, by themselves, tended to permit the pollutants to enter.

SUMMARY OF THE INVENTION

The present invention has an object to solve this problem by providing a magnetic seal system, which comprises basically a radial labyrinth defining a magnetic portion able to prevent naturally magnetic dust particles from entering into the ball bearings.

Notwithstanding that the present invention is described as applicable to belt conveyor rollers, the same will be applicable for other types of mechanical seals for bearings wherein a blocking of naturally magnetic particles may be necessary, such as in applications with bearing seals in apparatus for handling ore of iron and steel.

DESCRIPTION OF THE FIGURE

The FIGURE is an elevational cross-sectional view of the labyrinth seal system of the present invention.

DESCRIPTION OF THE PREFERRED EMBODIMENT

Referring to the FIGURE, a magnetic seal system for the roller bearings 11 of a belt conveyor idler or roller 12, 13 is shown. As therein seen, the system comprises a radial labyrinth 10 formed by a pair of radial rings of magnetic material 15', 15" axially separated from one another, and as is well known in the art of labyrinth seals, mounted for relative rotation with respect to each other.

The rings 15' and 15" are disposed between the roller bearing 11 and the ambient conditions or conditions outside the roller to prevent dust particles from entering the bearing 11.

Thus, naturally magnetic particles coming into the vicinity of the rings 15', 15" will be attracted to and held thereby without entering the bearing. As is clearly noted in the FIGURE, the magnetic rings form a relatively restrictive path without any rotational rubbing, and have an axial thickness to increase the magnetic attraction area in the vicinity of the most restrictive postion of the path, whereby the magnetic dust particles are attracted to the rings to provide an effective seal to such particles without increasing any rotational resistance or defining any wear parts.

I claim:

1. A magnetic seal system for bearings of belt conveyor rollers comprising a magnetic radial labyrinth seal (10) disposed between the bearing and ambient to prevent ambient naturally magnetic dust from entering said bearings and wherein the magnetic radial labyrinth (10) is formed by at least a pair of radial rings each defining a permanently magnetized material (15), said rings being axially separated from one another.

* * * * *